United States Patent
Lahr et al.

(12) 
(10) Patent No.: US 10,923,987 B2
(45) Date of Patent: Feb. 16, 2021

(54) ELECTRICAL SYSTEM WITH CYCLOIDAL ELECTRIC MACHINE

(71) Applicant: GM Global Technology Operations LLC, Detroit, MI (US)

(72) Inventors: Derek F. Lahr, Howell, MI (US); Alireza Fatemi, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 16/288,336

(22) Filed: Feb. 28, 2019

(65) Prior Publication Data

US 2020/0280241 A1 Sep. 3, 2020

(51) Int. Cl.
| | |
|---|---|
| *H02K 7/116* | (2006.01) |
| *H02K 7/00* | (2006.01) |
| *B60K 7/00* | (2006.01) |
| *H02K 16/02* | (2006.01) |
| *H02K 7/04* | (2006.01) |
| *F16H 1/32* | (2006.01) |

(52) U.S. Cl.
CPC ............ *H02K 7/116* (2013.01); *B60K 7/0007* (2013.01); *F16H 1/32* (2013.01); *H02K 7/006* (2013.01); *H02K 7/04* (2013.01); *H02K 16/02* (2013.01); *B60K 2007/0038* (2013.01); *H02K 2201/18* (2013.01)

(58) Field of Classification Search
CPC . H02K 7/04; H02K 16/02; H02K 1/16; B60Y 2400/60

USPC ............ 310/83, 216.001, 216.075, 216.092, 310/216.107
See application file for complete search history.

(56) References Cited

U.S. PATENT DOCUMENTS

| | | | | |
|---|---|---|---|---|
| 2,447,348 | A | * 8/1948 | Kucher | ............... F16H 61/4043 60/468 |
| 4,914,330 | A | 4/1990 | Pierrat | |
| 5,448,117 | A | 9/1995 | Elliott | |
| 5,479,058 | A | * 12/1995 | Seidou | ...................... F16H 1/32 310/261.1 |
| 5,685,269 | A | * 11/1997 | Witty | ..................... F02B 53/02 123/245 |
| 9,669,701 | B2 | 6/2017 | Bolt | |
| 9,890,832 | B2 | 2/2018 | Kurth et al. | |
| 10,023,406 | B2 | 7/2018 | Klubertanz et al. | |
| 10,090,747 | B2 | 10/2018 | Hofmeister | |

(Continued)

*Primary Examiner* — Jose A Gonzalez Quinones
(74) *Attorney, Agent, or Firm* — Quinn IP Law (57) ABSTRACT

An electrical system includes a cycloidal electric machine having a stator and a balanced rotor. The rotor is eccentrically positioned radially within the stator, such that the rotor moves with two degrees of freedom (2DOF). The 2DOF motion includes rotating motion about the rotor axis and orbiting motion about the stator axis. A rotor constraint mechanism constrains the motion of the rotor, such that the rotor is able to generate torque on a coupled load. Part of the rotor constraint mechanism may be integrally formed with the rotor. A coupling mechanism may be coupled to the rotor and configured to translate the 2DOF into 1DOF, i.e., rotation without orbital motion. The rotor may include mutually-coupled rotors. At least one counterweight may be connected to the rotor, e.g., externally or within the airgap. Balancing of the balanced rotor may be optionally provided via the multiple rotors and/or the counterweight(s).

20 Claims, 5 Drawing Sheets

(56) References Cited

U.S. PATENT DOCUMENTS

| | | | |
|---|---|---|---|
| 2009/0133518 A1* | 5/2009 | Kawamoto | H02K 7/116 74/89 |
| 2010/0132658 A1* | 6/2010 | Ngo | F02B 55/00 123/242 |
| 2012/0055740 A1* | 3/2012 | Allington | A62B 1/08 182/231 |

* cited by examiner

ELECTRICAL SYSTEM WITH CYCLOIDAL ELECTRIC MACHINE

Electric motors and generators are generally referred to in the art as rotary electric machines. Electric machines of this type include a rotating component/rotor and a stationary component/stator. The rotor may be disposed radially within the stator, such that the stator surrounds or circumscribes the rotor, although other embodiments exist in which the rotor resides outside of the stator. Depending on the configuration of the electric machine, permanent magnets or electromagnets may be arranged on and/or within laminations of the rotor. Equally-spaced radial slots around a perimeter of the stator may be wound with lengths of conductive wire or bar conductor segments.

A polyphase input voltage applied to the stator windings generates an electromagnetic field having an alternating polarity. Resulting push-pull forces between the rotor and stator fields ultimately causes the rotor to rotate about its longitudinal axis. The torque imparted by such rotation may be harnessed and used to produce useful work in a system. For example, the electric machine may be used as a motor, with torque from the electric machine driving a coupled load. When the electric machine functions as a generator, a prime mover may power the rotor and thereby produce electrical current for recharging a battery pack.

SUMMARY

The present disclosure relates generally to radial flux-type rotary electric machines having a stator and an eccentrically-positioned and balanced rotor. The rotor in some embodiments is separated from the stator by an airgap, with the size of the airgap varying with an orbiting position of the rotor. Other embodiments may be envisioned that maintain contact between the rotor and stator, and thus are characterized by an absence of such an airgap. The electric machine described herein is "cycloidal" in the sense that the rotor is constrained to move with two degrees of freedom: (1) rotary motion about the rotor's axis of rotation, and (2) orbiting motion about the stator's axis. For a typical rotary electric machine, the electromagnetic torque that is present within the above-noted airgap between the stator and rotor may be derived according to the following equation [1], with t and r respectively denoting radial and tangential torque components in an example cylindrical coordinate system:

$$T_e = F_t R L_{ef} \quad [1]$$

In equation [1], $T_e$ is the electromagnetic torque in newton-meters, R is the average radius of the airgap in meters, $L_{ef}$ if the effective stack length of the active materials of the electric machine, also in meters, and $F_t$ is the tangential forces present within the airgap in newtons. The tangential forces, $F_t$, are defined as:

$$F_t = \frac{P}{2} \int_0^{2\pi} f_t(\phi_r) R d\phi_r \quad [2]$$

where P is the number of poles of the electric machine, $f_t$ represents the tangential component of the airgap force density per unit length, and $\phi_r$ is the electrical angle covering each pole pair in radians.

According to the relationships expressed in equations [1] and [2], the radial airgap forces, which are several times larger than the tangential forces, do not contribute to the output torque of the electric machine. The disclosed embodiments of the cycloidal electric machine are therefore intended to incorporate the otherwise unused radial airgap forces into the machine's output torque so as to realize certain performance advantages, including enabling output of higher levels of motor torque at lower motor speeds.

As noted above, the balanced rotor is eccentrically-positioned with respect to the stator, with the stator surrounding the rotor in the various illustrated embodiments. An example embodiment of the electrical system includes the cycloidal electric machine and a rotor constraint mechanism (RCM). The eccentric positioning of the rotor with respect to the stator provides the rotor with two degrees of freedom (2DOF) of motion, i.e., rotating and orbiting motion.

The RCM is configured to constrain motion of the rotor, such that the rotor is able to generate torque on a coupled load, e.g., a drive axle, drive wheels, or other driven load. In some embodiments, the RCM may be integrally formed with the rotor, while in other embodiments the RCM may be embodied as an external set of components, e.g., a cycloidal gear set.

The electrical system may include an optional coupling mechanism, e.g., an Oldham coupler mechanism, that is mechanically connected to the balanced rotor. The coupling mechanism is configured to translate the above-noted 2DOF motion of the eccentric rotor into 1DOF motion, such as rotation of the rotor about the rotor's axis without accompanying orbiting motion. Such 1DOF motion may be used in various applications, including but not limited to powering a drive axle and/or drive wheels of a vehicle. The coupling mechanism may be omitted from other embodiments, such that rotating and orbiting motion is imparted to the driven load. Such 2DOF motion may be used in various beneficial applications, including but not limited to grinders, mixers, and washing machines.

In some configurations of the electric machine, the balanced rotor may include a plurality of mutually-coupled rotors, with the multiple rotors being the structure providing the noted balance to the balanced rotor. Alternatively, one or more counterweights may be connected to the rotor(s) to help balance the rotor.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 1:
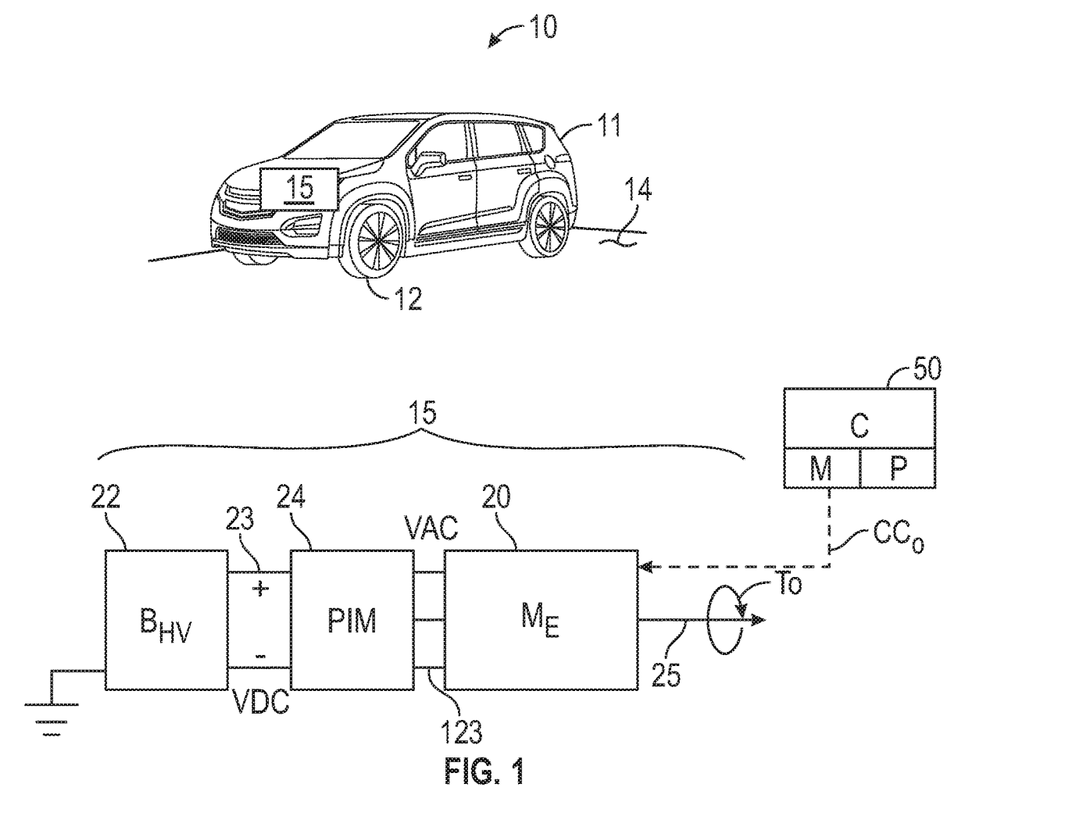
FIG. 1 is a schematic illustration of an example electrical system having a cycloidal electric motor as described herein.

Referring to the drawings, wherein like reference numbers refer to the same or like components in the several Figures, an electrical system 15 is shown schematically in FIG. 1. The electrical system 15 may be used as part of a vehicle 10 having a vehicle body 11, e.g., a motor vehicle having a set of road wheels 12 in rolling contact with a road surface 14. The electrical system 15 may also be used in other types of vehicles 10, for instance aircraft, watercraft, and rail vehicles, or in other mobile, non-vehicular applications such as robots and mobile platforms. Stationary applications may likewise benefit from use of the electrical system 15 as set forth below, and therefore the vehicle 10 of FIG. 1 is just one possible beneficial application of the present teachings.

Figure 2:
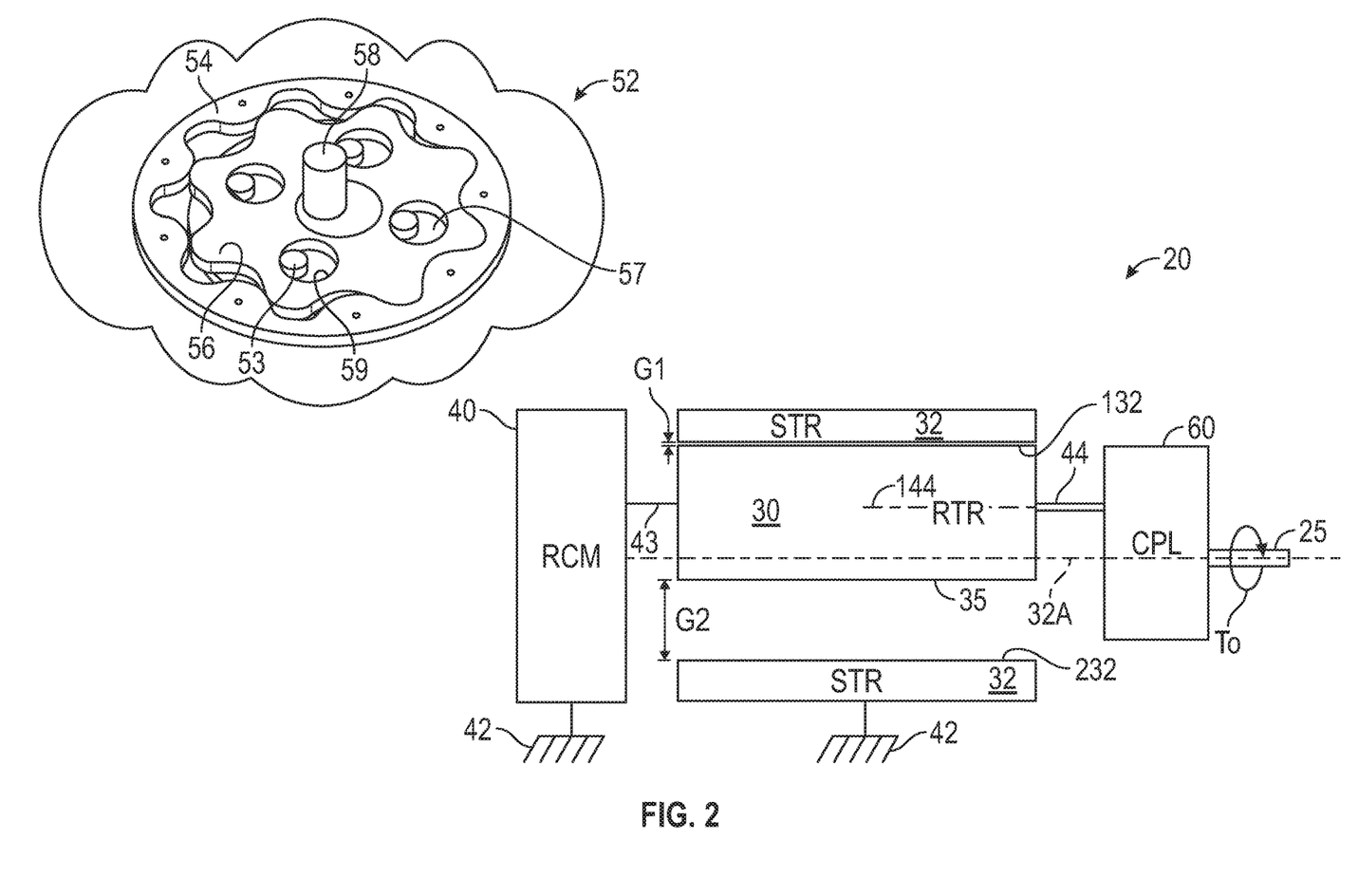
FIG. 2 is a schematic illustration of a cycloidal electric machine that is usable as part of the electrical system shown in FIG. 1.

The electrical system 15 includes a rotary cycloidal electric machine ($M_E$) 20 having an output member 25 that is coupled to a balanced rotor 30 (see FIG. 2). As used herein, "balanced" with respect to the rotor 30 and the electric machine 20 may be defined as a threshold low level of noise, vibration, and harshness (NVH) during operation of the rotor 30, such that the rotor 30 does not wobble or vibrate beyond the constrained two degrees of freedom (2DOF) noted herein. The electric machine 20 may be optionally embodied as a reluctance machine. As will be understood by those of ordinary skill in the art, reluctance machines, e.g., synchronous, switched, or variable reluctance machines, are characterized by an absence of permanent magnets on the rotor 30, and instead induce non-permanent magnetic poles on the rotor 30. As a result, motor output torque (arrow $T_O$) is generated via the principle of magnetic reluctance. In other embodiments, the electric machine 20 may be a permanent magnetic (PM)-type synchronous machine in which the motor output torque (arrow $T_O$) is generated via field interaction between the PM field of the rotor 30 and the time-varying field of the stator 32.

Figure 3:
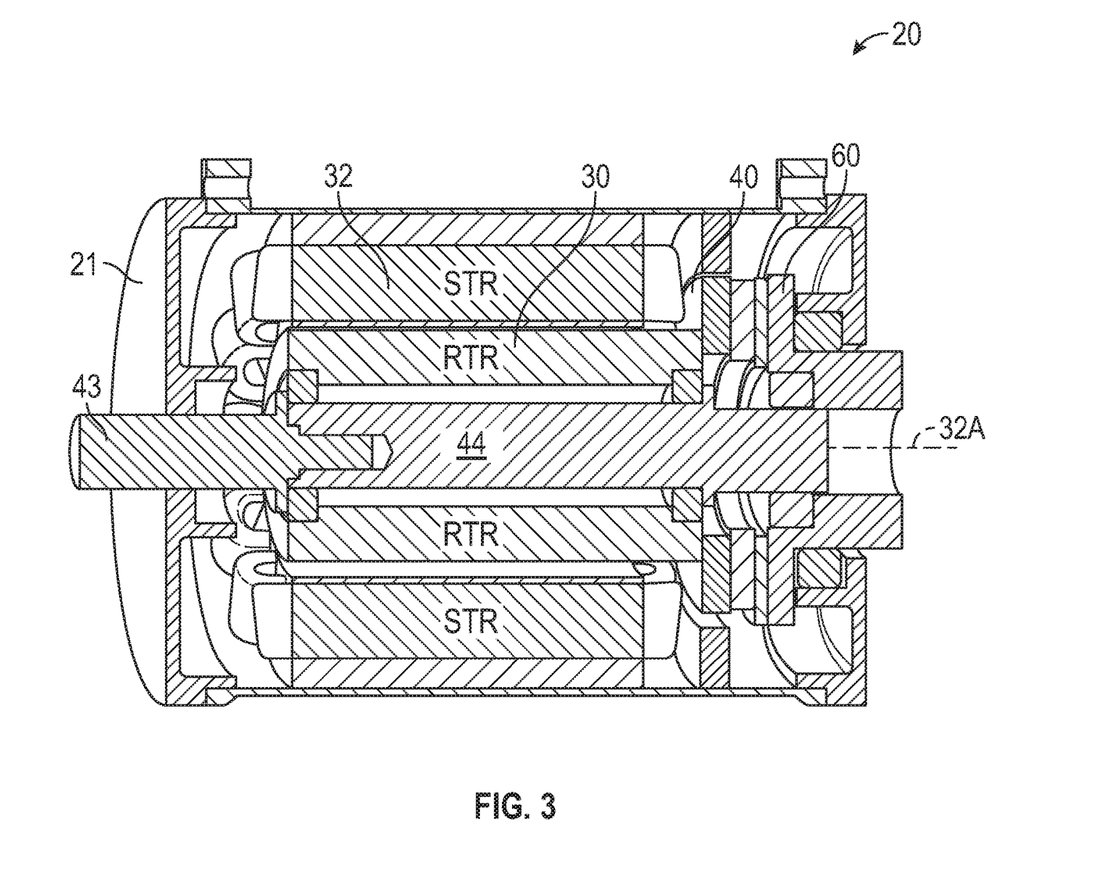
FIG. 3 is a schematic cross-sectional illustration of a possible embodiment of the cycloidal electric machine shown in FIG. 2.
Figure 4:
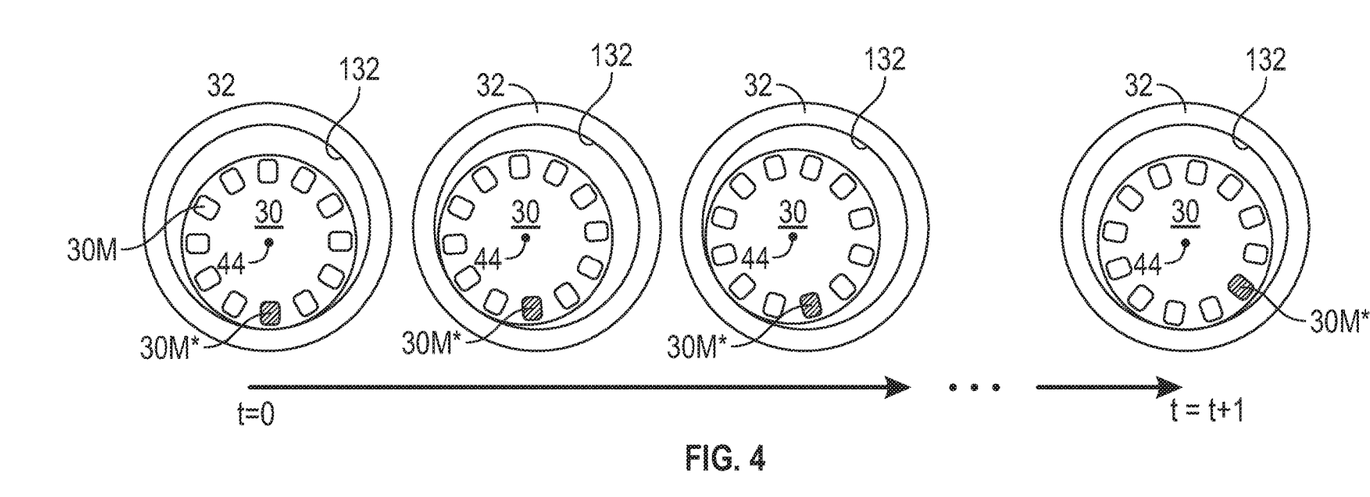
FIGS. 4 and 5 are schematic illustrations of respective rotating and orbiting motion of a rotor of the cycloidal electric machine of FIGS. 2 and 3.
Figure 5:
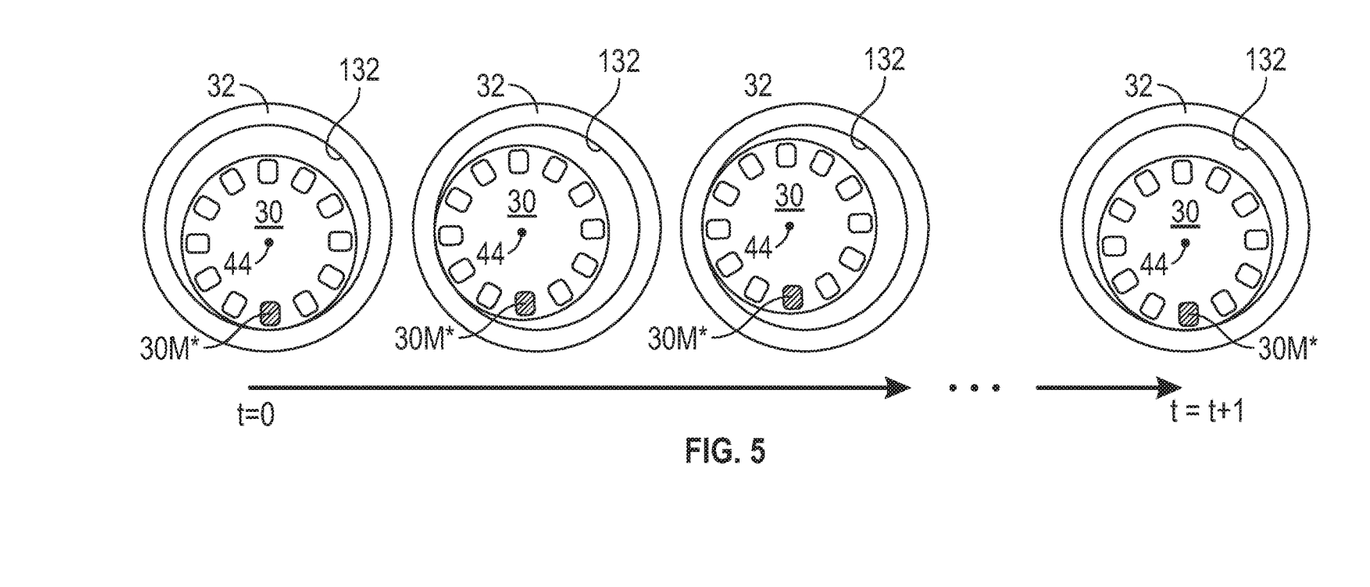

The electric machine 20 of FIGS. 1-3 is operable for providing motion with 2DOF, i.e., rotary and orbiting motion, as respectively detailed in FIGS. 4 and 5. Certain enhancements to the cycloidal electric machine 20 may be included within the scope of the disclosure, with an example multi-rotor embodiment described below with particular reference to FIG. 6. Collectively, the present teachings are intended to make beneficial use of otherwise largely unused radial airgap forces in the overall composition of the output torque (arrow $T_O$).

In the illustrated example embodiment of FIG. 1, the electrical system 15 includes a battery ($B_{HV}$) 22 and a power inverter module (PIM) 24. The battery 22 may optionally have a relatively high voltage capacity, e.g., 60 VDC or more depending on the embodiment, and thus "high-voltage" is indicated by subscript "HV". The cycloidal electric machine 20 may be embodied as a polyphase electric motor, for instance, and thus may be electrically connected to an AC bus 123, with the electric machine 20 energized by an AC voltage (VAC) from the PIM 24. The PIM 24 in turn is connected to the battery 22 via a DC voltage bus 23, with a DC voltage (VDC) supplied by the DC voltage bus 23 to the PIM 24 and vice versa depending on whether the cycloidal electric machine 20 functions as a motor or as a generator.

When energized, the cycloidal electric machine 20 generates and outputs the above-noted output torque (arrow $T_O$) to a driven load via the output member 25, for instance to a connected drive axle and/or the drive wheels 12 of the vehicle 10. Operation of the electrical system 15 may be regulated by a controller (C) 50 via control signals (arrow $CC_O$). The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

Referring to FIGS. 2 and 3, the balanced rotor 30 of the cycloidal electric machine 20 is an eccentrically-positioned rotor (RTR) 30. Rotor 30 is radially disposed with respect to the stator (STR) 32, which may be grounded to a stationary member 42 as shown. The electric machine 20 may include a housing 21 (FIG. 3) in which the rotor 30, the stator 32, and other components are disposed and structurally supported. The stator 32 may be separated from the rotor 30 by an airgap (G1, G2) in some embodiments, or the stator 32 may be in continuous contact with the rotor 30 at the instantaneous center of motion without sliding against an outer surface 35 of the rotor 30. The eccentric positioning of the rotor 30 provides the rotor 30 with the above-noted 2DOF, i.e., rotating motion and orbiting motion.

The balanced rotor 30 is eccentrically-positioned and disposed radially within the stator 32, i.e., surrounded or circumscribed by the stator 32 in the illustrated example cylindrical embodiment of FIGS. 2 and 3. The rotor 30 moves with rotating motion about a rotor axis 144, and orbiting motion around a center axis 32A of the stator 32, with the center axis 32A also referred to herein as the stator axis 32A. The rotor 30 and stator 32 may be mutually-separated from each other in some configurations by an airgap (G1 or G2). That is, depending on the orbiting position of the rotor 30 within the stator 32, the rotor 30 may be closer to a topmost inner surface 132, shown in FIG. 2 as the corresponding airgap G1, at which position the rotor 30 is farther away from a bottommost inner surface 232 of the stator 32, with the larger corresponding airgap G2. As the rotor 30 orbits within the stator 32, the relative size of airgaps G1 and G2 will change, i.e., the airgap G2 becomes smaller than the airgap G1 whenever the rotor 30 orbits 180-degrees away from the position depicted in FIG. 2. The airgap G1, G2 may be zero in other embodiments, e.g., when a multi-lobed cycloidal disc 56 is integrated into the structure of the rotor 30 as described below.

The electric machine 20 is connected to or includes a rotor constraint mechanism (RCM) 40. The RCM 40 is configured to constrain motion of the rotor 30 such that the rotor 30 is able to generate useful application-specific torque on a coupled load. In certain embodiments, portions of the RCM 40 may be integrally formed with the structure of the rotor 30, while in other embodiments the RCM 40 may be embodied as an external set of components, e.g., portions of a cycloidal gear set 52 powering an output shaft 58.

General operation of the electric machine 20 may be understood with reference to the cycloidal gear set 52 shown as an inset in FIG. 2. The cycloidal gear set 52 has a grounded/stationary outer gear element 54, within which is disposed the cycloidal disc 56. The cycloidal disc 56 defines equally-spaced holes 59. Pins 53, e.g., cylindrical posts as shown, may axially-extend from a gear element 57. The particular 2DOF motion enabled by the cycloidal gear set 52 will be appreciated by one of ordinary skill in the art, e.g., as a speed reduction mechanism.

The electrical system 15 shown in FIG. 1 may incorporate certain structural functional aspects of the example cycloidal gear set 52 into its constituent structure without bodily incorporating the cycloidal gear set 52 itself. For instance, the function of the stationary outer gear element 54 and the cycloidal disc 56 may be combined into the structure and function of the RCM 40, with an input member 43 of the rotor 30 bolted to structure of the RCM 40 corresponding to the cycloidal disc 56. Such structure enables the rotor 30 to be constrained so as to rotate about the rotor axis 144 and, at the same time, to orbit about the stator axis 32A.

The disclosed arrangement enables higher levels of output torque (arrow $T_O$) from the electric machine 20, particularly when the electric machine 20 is embodied as a non-permanent magnet machine, e.g., a switched reluctance motor with motion tailored to the generated fields, and with the controller 50 of FIG. 1 possibly controlling such fields. At least part of the RCM 40 may be integrally formed with the rotor 30 in certain embodiments. For instance, a profile of the rotor 30 may be constructed to approximate or match a profile of the illustrated cycloidal disc 56 of the example cycloidal gear set 52, with the stator 32 being similarly constructed to form the mating profile of the outer gear 54.

The balanced rotor 30 and/or the electric machine 20 may be optionally connected to a coupling mechanism (CPL) 60. The CPL 60 is configured to translate rotation of the rotor 30 from the rotor axis 144 to a driven load. The CPL 60 may be positioned downstream of the rotor 30, i.e., coupled to the output member 44 of the rotor 30 and configured to translate the 2DOF motion of the rotor 30 into 1DOF motion. As used herein, the term "1DOF motion" describes rotation of the output member 25 and a connected driven load without orbiting motion. So, when the driven load is the above-noted drive axle or drive wheels 12 of the representative vehicle 10 shown in FIG. 1, the 1DOF motion of the rotor 30 powers the drive axle.

Various embodiments may be envisioned for implementing the CPL 60, including but not limited to an Oldham coupling mechanism. As will be appreciated, Oldham couplings utilize a compact arrangement of discs, i.e., an input-coupled disc, an output-coupled disc, and a rotating middle disc joined to the input- and output-coupled discs by a mating tongue-and-groove connection. Alternatively, the post-and-hole configuration shown in the cycloidal gear set 52 of FIG. 2 may be used, or a gear train constructed of multiple spur gears may be employed to the same ends, with these being just a few possible ways to implement the CPL 60.

As disclosed above, use of the CPL 60 within the example electrical system 15 of FIG. 1 is optional. That is, certain applications may be readily envisioned that make beneficial use of orbiting motion of the output member 25. An example is that of a mixing operation in which simultaneous rotation and orbiting motion may be desirable, e.g., when powering beaters of the type used to mix cement or to blend a food product. Other possible applications may find such 2DOF motion to be beneficial, such as in the propulsion systems of unmanned rovers or other special purpose vehicles, or in grinders, mixers, and washing machines.

Referring briefly to FIGS. 4 and 5, the above-noted 2DOF motion is represented schematically via a sequence of motion commencing at time t=0 and continuing until a future point in time t=t+1. FIG. 4 shows an example of cycloidal motion, such that the rotor 30, shown with circumferentially-spaced reference points 30M for illustrative clarity, has rotary motion radially within the surrounding stator 32. Such motion is indicated by the changing position of a representative reference point 30M* between t=0 and t=t+1. FIG. 5 shows orbiting motion, such that the rotor 30 "slides" around the inner surface 132 of the stator 32. Pure rotary motion, pure orbiting motion, or combinations of rotary and orbiting motion may be used in different applications, as noted above.

While 2DOF motion is enabled by the cycloidal electric machine 20 described above with reference to FIGS. 1-5, such motion may be less than optimal in terms of noise, vibration, and harshness (NVH). That is, unbalanced mechanical and magnetic forces may be provided by the disclosed cycloidal electric machine 20, which might cause excessive loads to be transmitted through bearings of the rotor 30 as well as imparting excessive loads to the stator 32. To smooth operation of the electric machine 20 and lower undesirable NVH effects, various approaches may be taken to help balance the electric machine 20.

Figure 6:
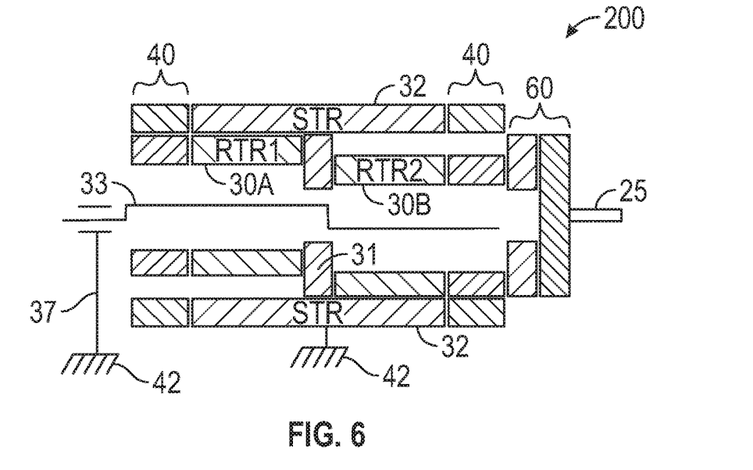
FIG. 6 is a schematic cross-sectional illustration of an alternative embodiment of the cycloidal electric machine shown in FIG. 2 having multiple rotors.

One such example approach to balancing of the balanced rotor 30 is shown in FIG. 6. A cycloidal electric machine 200 may have first and second rotors 30A and 30B, i.e., RTR1 and RTR2, respectively. Gear elements 31 may be used to couple the first and second rotors 30A and 30B as shown. Additional rotors may be used in other embodiments, and therefore the two rotors 30A and 30B are illustrative of the present teachings. The rotors 30A and 30B operate out of phase with each other, such that when the stator 32 is energized, the net side-pull forces are cancelled out. This effect more evenly distributes loads on the stator 32 and a rotor support shaft 33. The rotor support shaft 33 in turn may be connected to an offset shaft 37 to better maintain the requisite eccentricity of the rotors 30A and 30B. In the illustrated embodiment, the RCM 40 enforces pure rotary motion and thus requires, at minimum, one rotary constraint. The reduced NVH enabled by balancing via the multi-rotor configuration is therefore a benefit of the construction of FIG. 6.

Figure 7:
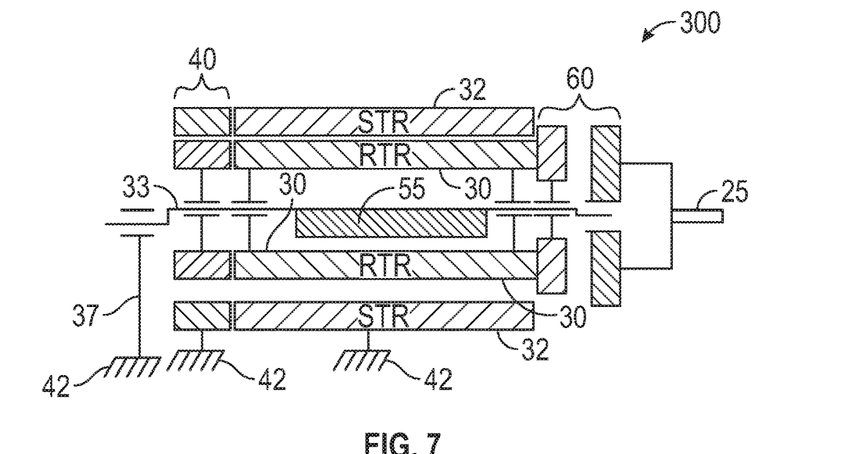
FIGS. 7 and 8 are schematic cross-sectional illustrations of alternative embodiments of the cycloidal electric machine utilizing counterweights.
Figure 8:
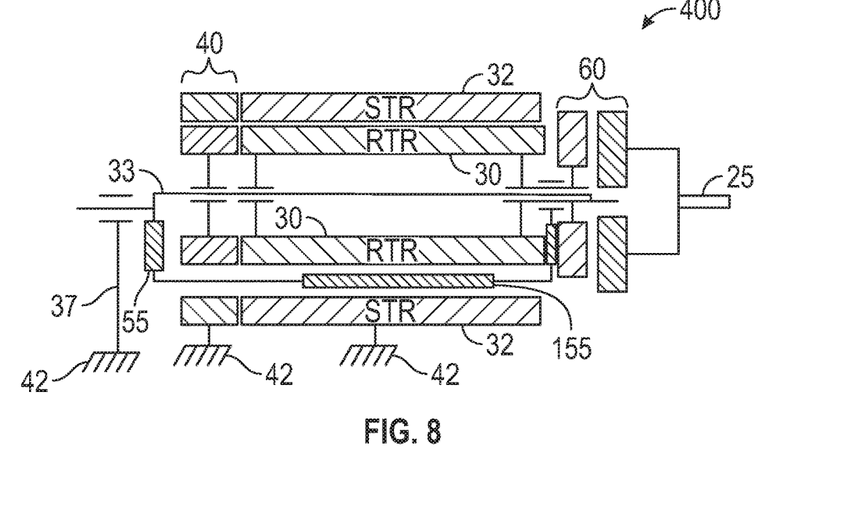

FIGS. 7 and 8 depict alternative electric machines 300 and 400, respectively, in which one or more counterweights 55 are connected to the rotor support shaft 33 to accomplish load balancing in a different or complementary manner from the approach shown in FIG. 6. For instance, counterweights 55 may be positioned in the interior of the rotor 30 as shown in FIG. 7 or external to the rotor 30 as shown in FIG. 8. A counterweight 155 located in the airgap between rotor 30 and stator 32 also has electromagnetic benefits, e.g., by reducing magnetic reluctance in the largest portion of the airgap. This in turn facilitates torque generation about the output member 25.

The cycloidal electric machine 20 of FIGS. 1-3 as described above employs the eccentric rotor 30 to provide an application-specific kinematic relationship between orbiting and rotational motion of FIGS. 4 and 5. The rotor 30 is constrained in such a way as to enable rotation about the rotor axis 144 and/or orbital translation about the stator axis 32A. As described above with reference to FIG. 6, this may be implemented using an offset rotor shaft 33, 37 and one or more gear pairs connecting the rotor 30 and stator 32, i.e., as the RCM 40. When enhanced by the multi-rotor 30 configuration of FIG. 6, it is possible that the structure and bearings of the electric machine 20 may be lightened, since reaction loads will not be transmitted through the structure of the electric machine 20. Likewise, the counterweights 55 and/or 155 of FIGS. 7 and 8 may be used to balance out the internal magnetic and mechanical forces such that these forces do not pass through bearings of the electric machine 20. These and other benefits will be readily appreciated by one of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
a cycloidal electric machine having a stator and a balanced rotor, the stator and the rotor having a respective stator axis and rotor axis, wherein the balanced rotor is eccentrically positioned with respect to the stator axis, radially within the stator, such that the balanced rotor moves with two degrees of freedom (2DOF), and wherein the 2DOF includes rotating motion about the rotor axis and orbiting motion about the stator axis; and
a rotor constraint mechanism (RCM) configured to constrain motion of the balanced rotor, such that the balanced rotor is able to generate and transmit output torque to a coupled load in at least one of the 2DOF.

2. The electrical system of claim 1, wherein the stator and the balanced rotor are separated from each other by an airgap.

3. The electrical system of claim 1, wherein at least part of the RCM is integrally formed with the balanced rotor.

4. The electrical system of claim 1, wherein the RCM is external to the balanced rotor.

5. The electrical system of claim 1, further comprising: a downstream coupling mechanism coupled to the balanced rotor and configured to translate the 2DOF into 1DOF, wherein the 1DOF is the rotating motion without the orbiting motion.

6. The electrical system of claim 5, wherein the coupled load is a drive axle of a vehicle.

7. The electrical system of claim 5, wherein the downstream coupling mechanism is an Oldham coupler mechanism.

8. The electrical system of claim 1, wherein the balanced rotor includes a plurality of mutually-coupled rotors collectively configured to balance the balanced rotor.

9. The electrical system of claim 1, further comprising: a counterweight connected to the balanced rotor, wherein a mass and position of the counterweight is configured to balance the balanced rotor.

10. The electrical system of claim 9, wherein the stator and the balanced rotor are separated from each other by an airgap, and the counterweight is positioned within the airgap.

11. The electrical system of claim 9, wherein the counterweight is positioned external to the balanced rotor.

12. An electrical system comprising:
a cycloidal electric machine having a stator with a stator axis and a balanced rotor having a rotor axis, wherein the stator and the balanced rotor are separated from each other by an airgap, and wherein the balanced rotor is eccentrically-positioned radially within the stator such that the balanced rotor has two degrees of freedom (2DOF), the 2DOF comprising rotating motion about the rotor axis and orbiting motion about the stator axis;
a rotor constraint mechanism (RMC) configured to constrain the motion of the balanced rotor, such that the balanced rotor is able to generate and transmit torque to a coupled load in at least one of the 2DOF; and
a downstream coupling mechanism that is coupled to the balanced rotor and configured to translate the 2DOF into 1DOF, wherein the 1DOF is the rotating motion without the orbiting motion.

13. The electrical system of claim 12, wherein at least part of the RCM is integrally formed with the balanced rotor.

14. The electrical system of claim 12, wherein the RCM is external to the balanced rotor.

15. The electrical system of claim 14, wherein the coupled load is a drive axle of a vehicle.

16. The electrical system of claim 12, wherein the downstream coupling mechanism is an Oldham coupler mechanism.

17. The electrical system of claim 12, wherein the balanced rotor includes a plurality of mutually-coupled rotors collectively configured to balance the balanced rotor.

18. The electrical system of claim 12, further comprising: a counterweight connected to the balanced rotor and configured to balance the balanced rotor.

19. The electrical system of claim 18, wherein the counterweight is positioned within the airgap.

20. The electrical system of claim 18, wherein the counterweight is positioned external to the balanced rotor.

* * * * *